C. M. CONRARDY.
FEEDING ATTACHMENT FOR THRESHING MACHINES.
APPLICATION FILED OCT. 4, 1913.
1,107,266.
Patented Aug. 18, 1914.
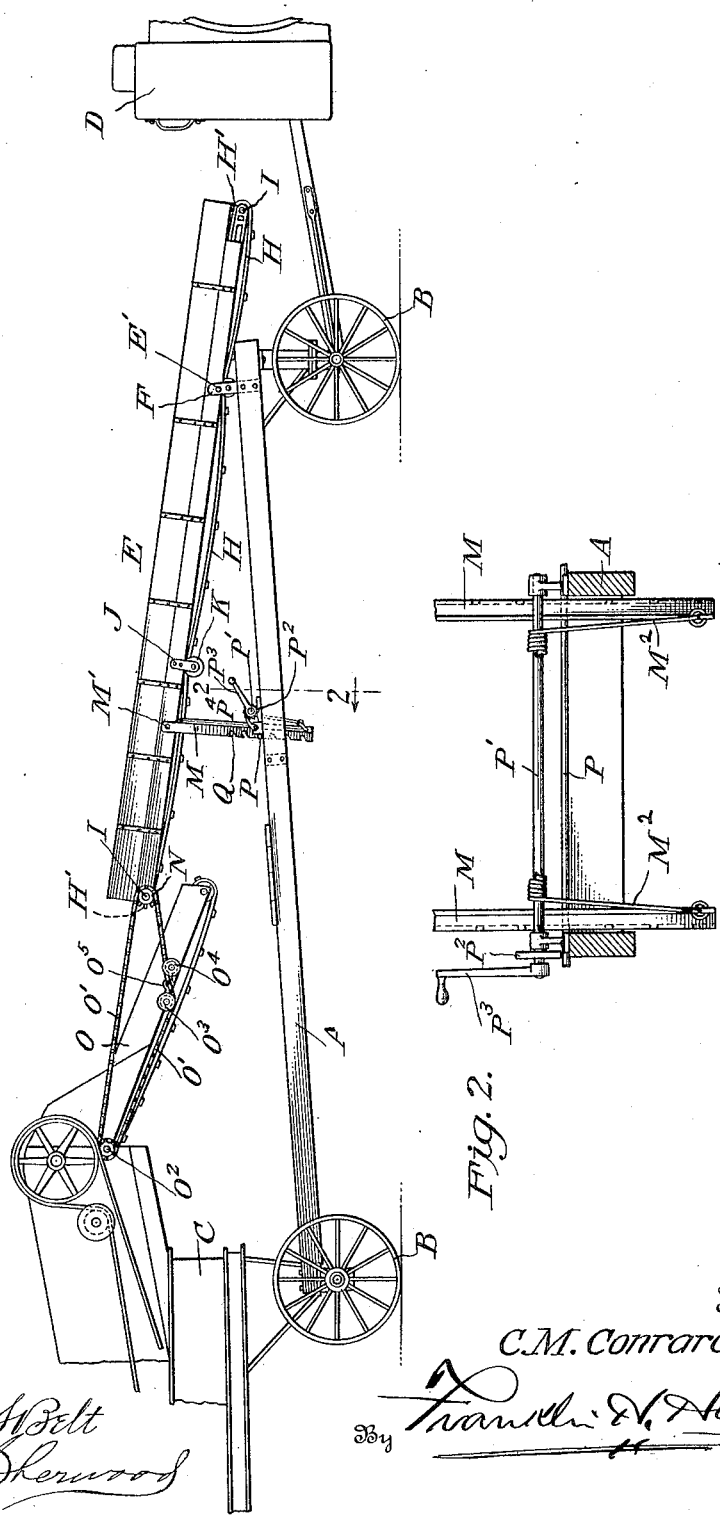

UNITED STATES PATENT OFFICE.

CASPER M. CONRARDY, OF WILLOWDALE, KANSAS.

FEEDING ATTACHMENT FOR THRESHING-MACHINES.

1,107,266.

Specification of Letters Patent.

Patented Aug. 18, 1914.

Application filed October 4, 1913. Serial No. 793,469.

*To all whom it may concern:*

Be it known that I, CASPER M. CONRARDY, a citizen of the United States, residing at Willowdale, in the county of Kingman and State of Kansas, have invented certain new and useful Improvements in Feeding Attachments for Threshing-Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in feeding attachments for threshing machines and comprises essentially the provision of a truck adapted to be fastened to a threshing machine whereby the latter may be drawn by a traction engine or other power and provided with an adjustable feeding trough designed to be attached to the feeder of the threshing machine when adapted for use.

The invention consists further n the provision of means consisting of a truck adapted to be fastened at one end to a threshing machine and the other to a traction engine and carrying an adjustable feed trough and serving as a means for anchoring securely the threshing machines at a fixed distance from the engine.

The invention comprises various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation showing the application of my invention to a threshing machine and illustrating the adjustable feed trough connected up to the thresher, and Fig. 2 is a sectional view taken on line 2—2 of Fig. 1.

Reference now being had to the details of the drawings by letter, A designates a truck mounted upon wheels B, the rear end of the truck being adapted to be connected to the threshing machine C in any suitable manner at one end, while its other end is connected to a traction engine D. A feeding trough, designated by letter E, is pivotally mounted upon pins E' projecting from the opposite walls of the feeder trough and pivotally mounted in the standards F which are fixed to the forward ends of the beams of the truck. Said feeding trough is provided with an endless chain conveyer H passing over sprocket wheels H' which are fixed to the shafts I journaled in suitable bearings at the ends of the trough and intermediate the ends of the latter are brackets J which carry grooved pulleys K adapted to support the conveyer chains. Upon the projecting end of the shaft I is a sprocket wheel N which, when the device is adjusted to the conveyer trough O of the thresher, is adapted to be connected to the sprocket chain O' driven by a sprocket wheel $O^2$ upon the machine. Pulleys $O^3$ and $O^4$ are fastened on stub shafts carried by a bar $O^5$ which is fastened to the side of the conveyer feeding trough O and which pulleys $O^3$ and $O^4$ are adapted to guide the sprocket chain O'. Bars, designated by letter M, are pivotally connected at their upper ends upon the pins M' and have notches, Q upon corresponding faces, which are adapted to engage over the edges of a cross-piece P which may be laid across the truck to hold the bars in adjusted positions. A shaft P' is journaled in suitable bearings upon the truck and carries a ratchet wheel $P^2$ and a crank handle $P^3$. A pawl $P^4$ engages the ratchet teeth and prevents the rotary movement of the shaft P' in one direction. Said bars M are provided at their lower ends with wire ropes $M^2$ which wind upon the shaft P' and serve as a means for raising and lowering the bars as the crank is turned to give the feeding trough E the desired inclination.

When the sections of the feeding troughs, one upon the truck and the other upon the thresher, are adjusted for use, they assume the positions shown in Fig. 1 of the drawings, in which their adjacent ends overlap, the conveyers of the two troughs being driven by the connections illustrated. When the belted connections are made between the engine and the threshing machine, it will be noted that the intermediate truck which is fastened to both will serve to anchor the threshing machine and engine in fixed relative positions, thus dispensing with any other anchorage mechanism commonly employed for this purpose.

What I claim to be new is:—

In combination with a truck and conveyer trough pivotally mounted thereon, bars pivotally mounted to the walls of the trough and having notches in corresponding edges thereof, a loosely mounted bar supported by the truck and engaged by said notches, a shaft upon the truck, cables fastened to the lower ends of said bars and adapted to wind upon said shaft, affording means for raising and lowering the bars, as set forth.

In testimony whereof I hereunto affix my signature in presence of witnesses.

CASPER M. CONRARDY.

Witnesses:
CLYDE MURPHY,
WALTON C. SAMPLE,
B. B. WELCH.

Copies of this patent may be obtained for five cents each, by addressing the "Commissioner of Patents, Washington, D. C."